United States Patent
Auffhammer et al.

[11] Patent Number: 6,141,616
[45] Date of Patent: Oct. 31, 2000

[54] WHEEL BRAKING REGULATING SYSTEM FOR MOTOR VEHICLES

[75] Inventors: Reinhard Auffhammer, Dachau; Stefan Pavic, Munich, both of Germany

[73] Assignee: Bayerische Motoren Werke Aktiengesellschaft, Munich, Germany

[21] Appl. No.: 09/310,967

[22] Filed: May 13, 1999

[30] Foreign Application Priority Data

Jun. 5, 1998 [DE] Germany .................... 198 25 304

[51] Int. Cl.$^7$ .................. G06F 7/70; G06F 19/00; G06G 7/00; G06G 7/76

[52] U.S. Cl. ............... 701/70; 701/71; 701/48; 188/2 R; 303/140; 303/146; 303/167; 180/275

[58] Field of Search ............... 701/70, 1, 53, 701/48, 71; 188/2 R; 180/275; 182/233; 303/167, 140, 146; 369/237

[56] References Cited

U.S. PATENT DOCUMENTS

| | | | |
|---|---|---|---|
| 5,219,212 | 6/1993 | Shimada et al. | 303/148 |
| 5,483,452 | 1/1996 | Tanaka | 701/70 |
| 5,526,263 | 6/1996 | Tanaka et al. | 701/70 |
| 5,576,960 | 11/1996 | Maeda | 701/70 |
| 5,694,321 | 12/1997 | Eckert et al. | 701/91 |
| 5,790,970 | 8/1998 | Brachert et al. | 701/70 |
| 5,947,221 | 9/1999 | Taniguchi et al. | 180/197 |
| 5,983,149 | 11/1999 | Tate et al. | 701/48 |

FOREIGN PATENT DOCUMENTS

| | | |
|---|---|---|
| 0 497 095 A2 | 8/1992 | European Pat. Off. . |
| 195 15 061 A1 | 5/1996 | Germany . |
| 196 17 590 A1 | 11/1997 | Germany . |

*Primary Examiner*—William A. Cuchlinski, Jr.
*Assistant Examiner*—Olga Hernandez
*Attorney, Agent, or Firm*—Evenson, McKeown, Edwards & Lenahan, P.L.L.C.

[57] ABSTRACT

A wheel braking system for a motor vehicle includes sensors, controllable actuators, and an electronic control device for regulating the rpm of a vehicle wheel when an actual driving state of the vehicle differs from a specified desired driving state calculated as a function of the driving parameters, using a mathematical vehicle model. An automatic correction of the vehicle model, corresponding to a deviation of the desired driving state specified at the moment from the actual driving state at the moment, is performed during vehicle operation if an ideal driving condition exists. The ideal driving condition is a driving state in which it is known that no deviation that leads to regulation occurs. At least one condition is defined by which it is detected whether ideal driving condition exists.

4 Claims, 1 Drawing Sheet

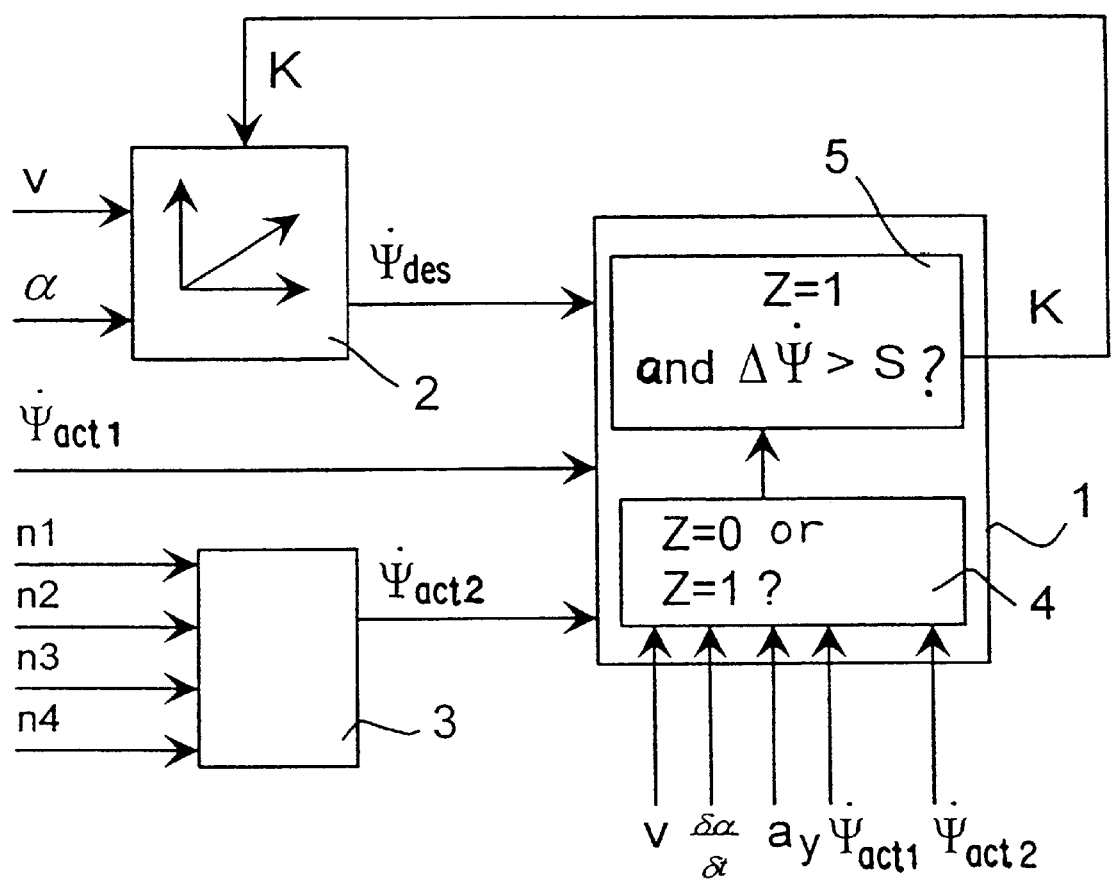
Figure

WHEEL BRAKING REGULATING SYSTEM FOR MOTOR VEHICLES

BACKGROUND AND SUMMARY OF THE INVENTION

This application claims the priority of German patent document 198 25 304, filed Jun. 5, 1998, the disclosure of which is expressly incorporated by reference herein.

The invention relates to a method and apparatus for regulating wheel braking in a motor vehicle.

A wheel braking regulating system of this generic type is used for example in the so-called DSC systems of BMW. (See for example ATZ-article, 1997, page 134 et seq. and page 208 et seq.). In wheel braking regulating systems of this kind the rpm of at least one wheel is regulated by selective brake applications, usually when an actual driving state differs from a specified desired driving state. The control algorithm required for this purpose is based on a mathematical vehicle model by which a specified desired driving state (for example, yaw velocity) is calculated as a function of various driving parameters, in the electronic control device which is conventionally found in wheel braking regulating systems. The vehicle model is stored as a characteristic map and/or as an algorithm.

A desired driving state is calculated by means of the vehicle model based for example, on driving parameters specified by the driver (for example steering wheel angle and accelerator position), vehicle parameters such as the center of gravity, steering behavior, tire slip rigidity, mass moment of inertia, etc. and certain environmental properties, such as the transverse slope and the changing coefficient of friction of the road. The model parameters which are used to calculate the desired driving state by means of the vehicle model are established once during the production of the vehicle. Changes in the vehicle that occur after production (for example different tires, different loading, aging of chassis parts such as shock absorbers and transverse links), in other words particularly those changes that are not covered by the vehicle parameters, are not taken into account in the calculation of the desired driving state. Consequently, the calculated specified desired driving state can differ from the actually desired driving state or from the ideal state. This degrades the system performance as a result of unnecessary and unjustified regulating interventions, with consequent adverse effects on comfort and performance disadvantages.

One object of the invention is to improve the comfort and performance of a wheel braking regulating system of the type recited at the outset.

These and other objects and advantages are achieved by the braking regulating method and apparatus according to the invention, in which a possible deviation of the calculated specified desired driving state from the ideal driving state is detected and corrected. The invention is based on the proposition that in certain driving conditions, especially during stable low-dynamic driving maneuvers, the actual driving state is identical to the ideal (desired) state, even without regulating intervention. (Conventional chassis tuning takes care of this.) Accordingly, when such driving conditions exist, there cannot be any deviation between the desired and actual momentary driving states that results in regulation. If, nevertheless, a deviation is detected in such driving conditions, the conclusion is drawn that driving parameters that are not included (and therefore are not taken into account in the vehicle model) have changed. Then, automatic correction of the vehicle model corresponding to the deviation is brought about in the electronic control device. This correction is preferably maintained until another correction is made.

According to the invention, at least one condition is defined as an indication that the current actual driving state exists that should be identical with an ideal (desired) driving state. One such condition for example is that the vehicle speed is at least approximately constant. Another is that the steering angle velocity, the transverse acceleration, the actual yaw velocity and/or the deviation of a measured actual yaw velocity from a calculated yaw velocity, in each case is below a specified threshold.

It is important that the correction of the vehicle model should be made only in a driving state in which the assumption that the actual driving state is identical with the ideal driving state, is in fact correct.

In the wheel braking regulating system according to the invention, with automatic correction of the vehicle model, optimum comfort is ensured both over a prolonged period of time (for example, the aging processes) and also during changes in vehicle properties (for example, different tires). A possible feeling of uncertainty on the part of the driver caused by unjustified regulating interventions or by deteriorated system performance is prevented as well.

Other objects, advantages and novel features of the present invention will become apparent from the following detailed description of the invention when considered in conjunction with the accompanying drawings.

BRIEF DESCRIPTION OF THE DRAWING

The single FIGURE of the drawing shows schematically one embodiment of a functional portion of the electronic control device for a wheel brake regulating system, according to the invention.

DETAILED DESCRIPTION OF THE DRAWING

In the FIGURE, the output signal $\dot{\Psi}_{des}$ of the mathematical vehicle model 2, the measured signal $\dot{\Psi}_{act1}$ and the output signal $\dot{\Psi}_{act2}$ of the yaw velocity calculation unit 3 are supplied to the correction monitoring unit 1. The output signal $\dot{\Psi}_{des}$ from vehicle model 2 is the calculated specified desired driving state in the form of a desired yaw velocity. The measured signal $\dot{\Psi}_{act1}$ corresponds to the measured actual yaw velocity. The output signal $\dot{\Psi}_{act2}$ is the calculated actual yaw velocity determined by the yaw velocity calculating unit 3 (in the present example from the four wheel rpm values n1 to n4). The actual yaw velocity in this case corresponds to the actual driving state, while the desired yaw velocity corresponds to the desired driving state. The yaw velocity is a preferred value for describing the vehicle state "rounding a curve." However, the invention can often be applied to other driving states.

The correction monitoring unit 1 contains an ideal driving state recognition unit 4 and a correction performance unit 5. The ideal driving state detection unit 4 contains the criteria for determining whether the current driving conditions of the vehicle are such that the actual driving state must be identical with an ideal driving state. The ideal driving state detection unit 4 receives, as input values, the vehicle -speed v, the steering angle velocity [δa/δt], the transverse acceleration ay, the measured actual yaw velocity $_{act1}$, and the calculated actual yaw velocity $\dot{\Psi}_{act2}$. An ideal driving state is determined to exist when the vehicle speed (v) is at least nearly constant;

the steering angle velocity [δa/δt] is below a threshold;

the transverse acceleration ($a_y$) is below a threshold;

the actual yaw velocity ($\dot{\Psi}_{act1}$; $\dot{\Psi}_{act2}$) is below a threshold; and/or the deviation of a measured actual yaw velocity ($\dot{\Psi}_{act1}$) from a calculated actual yaw velocity ($\dot{\Psi}_{act2}$) is below a threshold.

If the above condition is satisfied, the signal Z=1 is transmitted from the ideal driving state recognition unit 4 to the correction performance unit 5. Otherwise, the signal Z=0 is transmitted.

Vehicle model 2 in the present case is a characteristic map that can also be stored as an algorithm in a control device. In the vehicle model 2, the desired yaw velocity $\dot{\Psi}_{des}$ is calculated as the desired driving state, based on the vehicle speed and/or the steering angle α as driving parameters, and is fed to the correction monitoring unit 1. A check is made the correction monitoring unit 1 to determine whether the desired yaw velocity $\dot{\Psi}_{des}$ differs from the measured yaw velocity $\dot{\Psi}_{act1}$ for example. If any such deviation AT is greater than a specified threshold S and the signal Z=1 is present, an automatic correction of the vehicle model 2 is initiated by the correction performance unit 5. For example, a factor can be transmitted to the vehicle model 2 as the correction signal K that is stored and retained for the next specification of the desired driving state. The possibility of such a correction factor K can already be provided in the basic vehicle model specified during production. It is important that all of the desired driving states that can be specified in future can be corrected by such a correction factor.

Another important feature of the embodiment is the function of the ideal driving state detection unit 4, by which the determination is made as to whether regulation should be performed (with Z=0) with a deviation $\Delta\dot{\Psi}$, or can be corrected (Z=1).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Wheel braking regulating system for a motor vehicle having sensors, controllable actuators, and an electronic control device for regulating rpm of a wheel when an actual driving state differs from a specified desired driving state that is calculated as a function of the driving parameters by means of a mathematical vehicle model, wherein:

during vehicle operation, an automatic correction of vehicle model corresponding to deviation of a currently specified momentary desired driving state from a momentary actual driving state is performed when an ideal driving condition exists in which no deviation results in a regulation; and at least one condition is defined by which it is determined whether an ideal driving condition exists.

2. Wheel braking regulating system according to claim 1 wherein a condition for detecting that an ideal driving condition exists is that at least one of the following is true:

vehicle speed is at least approximately constant;

a vehicle steering angle velocity is below a threshold;

transverse vehicle acceleration is below a threshold;

an actual vehicle yaw velocity is below a threshold; and deviation of a measured actual vehicle yaw velocity from a calculated actual yaw velocity is below a threshold.

3. In a vehicle brake regulating system which generates a desired braking signal for regulating vehicle braking based on inputs from vehicle sensors using a mathematical vehicle model, a method for correcting said mathematical vehicle model comprising:

based on outputs from said sensors, detecting occurrence of an ideal vehicle operating condition in which no deviation can exist between desired braking and actual braking of said vehicle;

based on outputs from said sensors, determining actual vehicle braking during occurrence of said ideal vehicle operating condition;

comparing said determined actual vehicle braking with said desired braking signal during occurrence of said ideal vehicle operating condition; and when said determined actual vehicle braking differs by more than a predetermined amount from said desired braking signal, automatically adjusting parameters of said mathematical vehicle made in a manner which reduces said difference.

4. A vehicle brake regulating system, comprising:

a plurality of sensors for measuring vehicle operating parameters;

a control unit coupled to receive output signals from said sensors;

a mathematical vehicle model stored in a memory associated with said control unit, for generating a desired braking signal in response to said output signals from said sensors;

means for determining momentary actual braking of said vehicle, based on outputs from said sensors;

means responsive to said output signals from said sensors for detecting occurrence of a predetermined vehicle operating condition in which no deviation can exist between desired braking and actual braking of said vehicle;

a unit which is coupled to receive said determined momentary actual braking and said desired braking signal as inputs, for generating a correction signal for correcting model parameters of said mathematical vehicle model when a difference between said determined momentary actual braking and said desired braking signal exceeds a preset value during a time when said predetermined vehicle operating condition exists.

* * * * *